(12) United States Patent
Xiao

(10) Patent No.: US 10,246,354 B2
(45) Date of Patent: *Apr. 2, 2019

(54) DEVICE FOR PREPARING WASHING WATER

(71) Applicant: DALIAN SHUANGDI INNOVATIVE TECHNOLOGY RESEARCH INSTITUTE CO., LTD., Dalian, Liaoning (CN)

(72) Inventor: Zhibang Xiao, Dalian (CN)

(73) Assignee: DALIAN SHUANGDI INNOVATIVE TECHNOLOGY RESEARCH INSTITUTE CO., LTD., Dalian (CN)

(*) Notice: Subject to any disclaimer, the term of this patent is extended or adjusted under 35 U.S.C. 154(b) by 177 days.

This patent is subject to a terminal disclaimer.

(21) Appl. No.: 15/301,431

(22) PCT Filed: Apr. 10, 2015

(86) PCT No.: PCT/CN2015/076242
§ 371 (c)(1),
(2) Date: Oct. 3, 2016

(87) PCT Pub. No.: WO2015/154709
PCT Pub. Date: Oct. 15, 2015

(65) Prior Publication Data
US 2017/0029296 A1    Feb. 2, 2017

(30) Foreign Application Priority Data
Apr. 12, 2014    (CN) .......................... 2014 1 0145728

(51) Int. Cl.
*C02F 1/467* (2006.01)
*C25B 9/08* (2006.01)
(Continued)

(52) U.S. Cl.
CPC ............ *C02F 1/467* (2013.01); *C02F 1/4672* (2013.01); *C02F 1/46104* (2013.01); *C25B 9/08* (2013.01);
(Continued)

(58) Field of Classification Search
None
See application file for complete search history.

(56) References Cited

U.S. PATENT DOCUMENTS 4,422,917 A * 12/1983 Hayfield .................. C25C 7/02
204/196.01
4,992,156 A *  2/1991 Silveri ................. C02F 1/46104
204/229.5
(Continued)

FOREIGN PATENT DOCUMENTS

CN    1130689 A    9/1996
CN    1774402 A    5/2006
(Continued)

OTHER PUBLICATIONS

Jul. 3, 2015 International Search Report issued in International Patent Application No. PCT/CN2015/076242.
(Continued)

*Primary Examiner* — Harry D Wilkins, III
(74) *Attorney, Agent, or Firm* — Oliff PLC

(57) ABSTRACT

A device for preparing washing water, belonging to the technical field of electro-chemical and membrane filtration water treatment. The device comprises a water container which is respectively provided with a water inlet and a water outlet; at least one pair of a cathode and an anode are arranged within the water container; a water-permeable porous membrane is clamped between the coupled cathode and anode with no gaps, and the area of the inside of the water-permeable porous membrane opposite the cathode or (Continued)

the anode is smaller than the area of the inside of the cathode or the anode opposite the water-permeable porous membrane. The device can generate washing water which contains a large a number of ultra-micro bubbles and strong oxidation factors and has excellent reducibility.

13 Claims, 1 Drawing Sheet

(51) Int. Cl.
  *C02F 1/461* (2006.01)
  *C02F 103/00* (2006.01)
(52) U.S. Cl.
  CPC ............... *C02F 2001/46138* (2013.01); *C02F 2001/46161* (2013.01); *C02F 2103/00* (2013.01); *C02F 2201/46115* (2013.01); *C02F 2201/46175* (2013.01); *C02F 2303/04* (2013.01)

(56) References Cited

U.S. PATENT DOCUMENTS

| | | | |
|---|---|---|---|
| 5,635,053 A | 6/1997 | Aoki et al. | |
| 5,958,242 A * | 9/1999 | Fennell | B01D 35/06 |
| | | | 204/554 |
| 6,375,823 B1 * | 4/2002 | Matsuda | C25D 5/02 |
| | | | 205/117 |
| 6,409,904 B1 * | 6/2002 | Uzoh | B24B 37/042 |
| | | | 205/137 |
| 6,841,058 B2 | 1/2005 | Culvey et al. | |
| 9,878,927 B2 * | 1/2018 | Servida | C02F 1/4693 |
| 2003/0188976 A1 | 10/2003 | Culvey et al. | |
| 2011/0259747 A1 * | 10/2011 | Cui | C02F 1/46109 |
| | | | 204/554 |
| 2011/0315560 A1 * | 12/2011 | Rabaey | C02F 1/4618 |
| | | | 205/344 |
| 2014/0346046 A1 * | 11/2014 | Andelman | C02F 1/4691 |
| | | | 204/554 |

FOREIGN PATENT DOCUMENTS

| | | |
|---|---|---|
| CN | 103936108 A | 7/2014 |
| CN | 103936114 A | 7/2014 |
| CN | 103938219 A | 7/2014 |
| CN | 103938412 A | 7/2014 |
| CN | 203833682 U | 9/2014 |
| CN | 203833686 U | 9/2014 |
| CN | 203834031 U | 9/2014 |
| CN | 203834207 U | 9/2014 |
| JP | 2011-147789 A | 8/2011 |

OTHER PUBLICATIONS

Oct. 12, 2016 International Preliminary Report on Patentability issued in International Patent Application No. PCT/CN2015/076242.

Feb. 4, 2015 Office Action issued in Chinese Patent Application No. 201410145728.3.

* cited by examiner

DEVICE FOR PREPARING WASHING WATER

BACKGROUND OF THE INVENTION

Technical Field

The present invention relates to a device for preparing washing water, belonging to the technical field of electrochemical and membrane filtration water treatment.

Description of the Related Art

During living and industrial and agricultural production, washing articles with water is seen everywhere, for example, laundry, fruits and vegetables washing, bathing, dish washing, industrial parts washing, etc. The purpose of washing is to remove various contaminants attached to the articles.

To intensify washing and improve washing quality, various washing aids are usually added to the water, for example, washing powder, surfactants, etc. If the washing water contains quite a number of bubbles, it is easy to remove dirt attached to the articles. Water with more and finer bubbles with a longer lasting time tends to deeply seep into the washed articles and achieves a better washing effect. One of the functions of washing powder is to generate bubbles. However, common washing powder generates large bubbles and a lot of foam, so that it becomes difficult to rinse. Known bubble generating technologies for washing, for example the mechanical high-pressure bubble generating technologies, ultrasonic wave technologies, etc. applied to washing machines still generate large bubbles, and devices of such technologies are complicated and have low efficiency.

It is known that, the use of a large amount of detergents causes serious environmental pollution and the detergents tend to adhere to washed objects thus generating new pollution. For example, clothes with washing powder residues easily cause skin allergy and result in skin diseases. It is also difficult to completely remove dishwashing liquid even if dishes are rinsed many times. In order to reduce environmental pollution caused by detergents and to bleach, sterilize and distill washed articles, various special technologies have been developed at present. For example, adding bleaching agents are added into detergents or ozone technologies, generation of hypochlorite ion through electrolysis by adding salt (sodium chloride), atomic oxygen technologies and sterilization with acidic water have been developed to improve the sterilization capabilities of washing water. However, the technologies have technical defects of single sterilization and sterilization functions or low cost performance and therefore are not yet popularity present. An existing detergent-free washing machine which performs electrolysis by using an isolating membrane works in the following principle: water is hydrolyzed and becomes weak alkaline water (with a pH value of 9-11, equivalent to weak alkaline water generated by dissolving detergents in water); the weak alkaline water performs saponification with dirt attached to clothes and drives washing water to generate active oxygen and hydrochloric acid. Due to the single function of removing dirt through the saponification, so the washing effect is undesirable.

BRIEF SUMMARY OF THE INVENTION

The technical problem to be solved by the present invention is to provide a device which can generate washing water which contains a large a number of ultra-micro bubbles and strong oxidation factors and has excellent reducibility.

To solve the above technical problems, the present invention puts forwards the following technical scheme: a device includes a water container which is respectively provided with a water inlet and a water outlet; at least one pair of a cathode and an anode are arranged within the water container; a water-permeable porous membrane is clamped between the coupled cathode and anode with no gaps, and the area of the inside of the water-permeable porous membrane opposite the cathode or the anode is smaller than the area of the inside of the cathode or the anode opposite the water-permeable porous membrane.

In the above technical scheme, the water-permeable porous membrane is also called water-permeable porous membrane or water-permeable isolating membrane, referring to a membrane through which water molecule can pass and with a water-permeable aperture ranging from a millimeter scale to a nano-meter scale. Various filtration membranes used for daily water treatment are included, for example: ultra-filtration membrane (UF), nano-filtration membrane (NF) and micro-filtration membrane (MF), etc.

As an improvement of the technical scheme of the present invention, the water-permeable porous membrane has a water-permeable aperture which is smaller than or equal to 2 mm and greater than or equal to 1 nm.

As an improvement to the technical scheme of the present invention, either the cathode or the anode is formed with pores on the surface thereof.

As an improvement of the technical scheme of the present invention, the minimum ratio of the area of the water-permeable porous membrane to the area of the cathode or anode is 4:5-3:5.

As an further improvement to the technical scheme of the present invention, the cathode and anode are powered by a non-symmetrical alternating pulse power supply; peak levels of forward and backward pulses of the power supply are both 5-36V, and pulse frequency is 10-20 Hz.

As a further improvement to the technical scheme of the present invention, the cathode and the anode are inertia electrodes prepared by round platinum-coated titanium oxides; the water-permeable porous membrane is a round plane ultra-filtration membrane with a mean water-permeable aperture of 0.01-0.05 μm, and the water-permeable porous membrane has a thickness of 0.2-1 mm.

As a further improvement of the technical scheme of the present invention, the water-permeable porous membrane is a single-layer or multi-layer membrane.

The device for preparing washing water of the present invention has the following beneficial effects:

1. The water contains a huge amount of ultra-micro bubbles, the majority of which are hydrogen bubbles.

2. The water has high reducibility, and the redox potential is negative.

3. When the electrolytic anode is made from non-carbon materials, the water also contain quite a number of strong oxidation factors, for example, hydrogen peroxide ($H_2O_2$), ozone $O_3$, hydroxyl radical•OH, etc., presenting certain sterilization and distillation capabilities in a macroscopic view.

The description of the reasons and principles of the beneficial effects can be seen in the related preparing mechanism analysis in the following specific implementation modes.

BRIEF DESCRIPTION OF THE SEVERAL VIEWS OF THE DRAWINGS

The device for preparing washing water of the present invention is described in further detail in conjunction with the attached drawings.

DETAILED DESCRIPTION OF THE INVENTION

Embodiment 1

Figure 1:
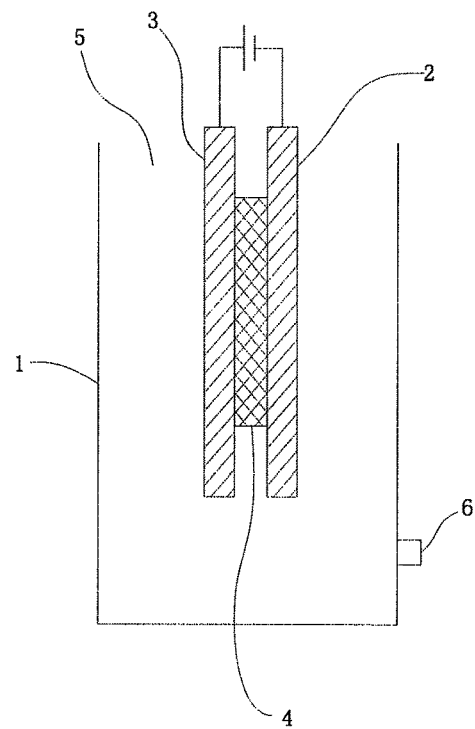
FIG. 1 is a structural view of a device for preparing washing water according to an embodiment of the present invention.

A device for preparing washing water in the embodiment can be seen in FIG. 1, comprising a water container 1 which is respectively provided with a water inlet 5 and a water outlet 6. The water container 1 is an open container. A pair of a cathode 2 and an anode 3 are arranged within the water container 1. A water-permeable porous membrane 4 is clamped between the coupled cathode 2 and anode 3 with no gaps. The area of the inside of the water-permeable porous membrane 4 opposite the cathode 2 or the anode 3 is smaller than the area of the inside of the cathode 2 or the anode 3 opposite the water-permeable porous membrane 4. The water-permeable porous membrane 4 has a water-permeable aperture which is smaller than or equal to 2 mm and greater than or equal to 1 nm.

According to the embodiment, the cathode 2 and the anode 3 are both inertia electrodes prepared by round platinum-coated titanium oxides with equal areas; the water-permeable porous membrane 4 is a round plane ultra-filtration membrane with a mean water-permeable aperture of 0.01-0.05 μm, and the ultra-filtration membrane has a thickness of 0.2-1 mm. The ratio of the area of the ultra-filtration membrane to the area of the minimum electrode is 4:5 (or 3:5).

According to the embodiment, the cathode 2 and anode 3 are charged with non-symmetrical alternating pulse power supply; peak levels of forward and backward pulses of the power supply are both 5-36V, and pulse frequency is 10-20 Hz.

The following is the preparing mechanism analysis of the device for preparing washing water in embodiment 1.

1. On the outer edge side of the water-permeable porous membrane 4, the cathode 2 and the anode 3 present membrane-less electrolysis, meaning that the hydrogen is separated at the cathode while oxygen is separated at the anode. The gap between the cathode and the anode is very small, so the electrolysis reaction is usually intense and a very small electrolysis voltage can generate a very large electrolysis current.

2. The water-permeable porous membrane 4 clamped between the hole-less cathode and anode with no gaps (zero-distance) forms a small-sized three-dimensional water storage space consisting of numerous pieces of micro-interspace. Water molecules are limited in each micro-porous space to be electrolyzed. Due to zero-space electrolysis, the process of separating hydrogen at the cathode 2 and separating oxygen at the anode 3 hardly begins, hydrogen and oxygen can only be dynamically stored in the micro-porous space in a free ionic state, or are combined and reduced into water and then re-electrolyzed into hydrogen ions and hydroxide ions. After such repeated processes, the water-permeable porous membrane is internally formed with a similar plasma environment (where gaseous state, atomic state and ionic state co-exist) for an intense reaction, resulting in a rise in partial voltage and temperature, and generating a certain pressure difference and a certain temperature difference in comparison with the space between the outer edge of the water-permeable porous membrane 4 and the two electrodes, namely the cathode and anode. Then, hydrogen and oxygen ions limited and co-existing in the micro-porous space in various states disperse along the radial outer side of the water-permeable porous membrane 4, participating in the membrane-less electrolysis reaction which occurs in the space between the outer edge of the water-permeable porous membrane 4 and the two electrodes.

3. With participation of the ions dispersing from the water-permeable porous membrane 4, the membrane-less electrolysis reaction in the space between the outer edge of the water-permeable porous membrane 4 and the two electrodes, namely the cathode and the anode, more intense. Hydrogen molecules are very small and more easily obtained cathode electrons during the intense reaction to change into hydrogen gas and escape, generating hydrogen gas (bubbles) far more than hydrogen gas (bubbles) generated by the conventional electrolysis methods in water. Or, hydrogen atoms enter the water in the form of negative hydrogen ions, so that the redox potential of water reduces quickly. Hydrogen gas has a strong permeability. Water rich in a huge amount of hydrogen bubbles, which is used as washing water, can deeply seep into articles, achieving an effect much better than other bubbles. The low redox potential of water is a great help in reducing and clearing pollutants such as heavy metals, pesticides and organics in water.

4. The majority of the oxygen atoms or OH ions in the space between the outer edge of the water-permeable porous membrane 4 and the two electrodes, namely the cathode and the anode are further combined with and react with the hydrogen to generate $H_2O_2$ before generating oxygen gas; OH radicals lose electrons and change into•OH; and some $O_2$ are combined with O to become $O_3$. Finally, the comprehensive strong oxidation factors in water scheme increase in quantity.

According to the above analysis it is known that, the device for preparing washing water in embodiment 1 has the following beneficial effects: 1. The water contains a huge amount of ultra-micro bubbles, the majority of which are hydrogen bubbles. 2. The water has high reducibility, and the redox potential is negative. 3. When the electrolytic anode is made from non-carbon materials, the water also contains quite a number of strong oxidation factors, for example, hydrogen peroxide ($H_2O_2$), ozone $O_3$, hydroxyl radical•OH, etc. presenting a certain sterilization and distillation capabilities in a macroscopic view.

Embodiment 2

Figure 2:
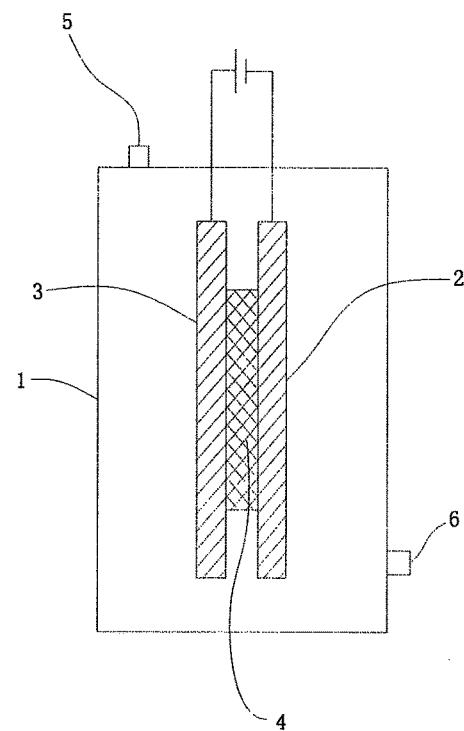
FIG. 2 is a schematic view of a variable structure of a device for preparing washing water according to an embodiment of the present invention.

As shown in FIG. 2, the device for preparing washing water in embodiment 2 is different from the one in embodiment 1 in that: 1) either a cathode 1 or an anode is formed with pores on the surface thereof; 2) the water container 1 is a closed container.

The device for preparing washing water of the present invention is not limited by the specific technical schemes of the above embodiments, for example, 1) two or more pairs of cathodes 2 and anodes 3 can be arranged; 2) the water-permeable porous membrane 4 may be formed by superposing two or more layers of ultra-filtration membranes; 3) the shape of the ultra-filtration membrane may be square, etc. Technical schemes made by equivalent substitutions all fall within the protective scope of the claims of the present invention.

What is claimed is:

1. A device for preparing washing water, comprising a water container which is respectively provided with a water inlet and a water outlet; at least one pair of a cathode and an anode being coupled with each other and arranged within the water container; wherein, a water-permeable porous membrane is clamped between the coupled cathode and anode with no gaps between the water-permeable porous membrane and the cathode and between the water-permeable porous membrane and the anode, a surface area of a side of the water-permeable porous membrane facing the cathode or the anode is smaller than a surface area of a side of the cathode or of the anode facing the water-permeable porous membrane, and a ratio of the surface area of a side of the water-permeable porous membrane to the smaller one of the surface area of a side of the cathode and the surface area of a side of the anode is 4:5-3:5.

2. The device for preparing washing water according to claim 1, wherein the water-permeable porous membrane has a water-permeable aperture which is smaller than or equal to 2 mm and greater than or equal to 1 nm.

3. The device for preparing washing water according to claim 2, wherein the cathode and anode are powered by a non-symmetrical alternating pulse power supply; peak levels of forward and backward pulses of the power supply are both 5-36V, and pulse frequency is 10-20 Hz.

4. The device for preparing washing water according to claim 2, wherein the cathode and the anode are both inert electrodes prepared by round platinum-coated titanium oxides; the water-permeable porous membrane is a round plane ultra-filtration membrane with a mean water-permeable aperture of 0.01-0.05 μm, and the water-permeable porous membrane has a thickness of 0.2-1 mm.

5. The device according to claim 1, wherein either the cathode or the anode has pores on the surface thereof.

6. The device for preparing washing water according to claim 5, wherein the cathode and anode are powered by a non-symmetrical alternating pulse power supply; peak levels of forward and backward pulses of the power supply are both 5-36V, and pulse frequency is 10-20 Hz.

7. The device for preparing washing water according to claim 5, wherein the cathode and the anode are both inert electrodes prepared by round platinum-coated titanium oxides; the water-permeable porous membrane is a round plane ultra-filtration membrane with a mean water-permeable aperture of 0.01-0.05 μm, and the water-permeable porous membrane has a thickness of 0.2-1 mm.

8. The device for preparing washing water according to claim 1, wherein the cathode and anode are powered by a non-symmetrical alternating pulse power supply; peak levels of forward and backward pulses of the power supply are both 5-36V, and pulse frequency is 10-20 Hz.

9. The device for preparing washing water according to claim 1, wherein the cathode and the anode are both inert electrodes prepared by round platinum-coated titanium oxides; the water-permeable porous membrane is a round plane ultra-filtration membrane with a mean water-permeable aperture of 0.01-0.05 μm, and the water-permeable porous membrane has a thickness of 0.2-1 mm.

10. The device for preparing washing water according to claim 1, wherein the water-permeable porous membrane is a single-layer or multi-layer membrane.

11. The device for preparing washing water according to claim 1, wherein the cathode, the anode and the water-permeable porous membrane are each in a plate shape.

12. The device for preparing washing water according to claim 1, wherein the surface area of the side of the water-permeable porous membrane facing the cathode is in direct contact with and is smaller than the surface area of the side of the cathode facing the water-permeable porous membrane, and the surface area of the side of the water-permeable porous membrane facing the anode is in direct contact with and is smaller than the surface area of the side of the anode facing the water-permeable porous membrane.

13. The device for preparing washing water according to claim 1, wherein a portion of cathode and a portion of the anode face each other with no portion of the water-permeable porous membrane there-between.

* * * * *